United States Patent
Muramatsu

(10) Patent No.: US 10,551,234 B2
(45) Date of Patent: Feb. 4, 2020

(54) THERMAL TYPE FLOW METER, FLOW RATE PROCESSING DEVICE, AND THERMAL TYPE FLOW RATE MEASUREMENT METHOD USING THE SAME

(71) Applicant: OMRON Corporation, Kyoto (JP)

(72) Inventor: Takashi Muramatsu, Kyoto (JP)

(73) Assignee: OMRON Corporation, Kyoto (JP)

( * ) Notice: Subject to any disclaimer, the term of this patent is extended or adjusted under 35 U.S.C. 154(b) by 142 days.

(21) Appl. No.: 15/839,868

(22) Filed: Dec. 13, 2017

(65) Prior Publication Data

US 2018/0266863 A1   Sep. 20, 2018

(30) Foreign Application Priority Data

Mar. 14, 2017   (JP) .................................. 2017-048840

(51) Int. Cl.
  *G01F 1/699* (2006.01)
  *G01F 1/69* (2006.01)
(52) U.S. Cl.
  CPC ................ *G01F 1/699* (2013.01); *G01F 1/69* (2013.01)
(58) Field of Classification Search
  CPC . G01F 1/699; G01F 1/684; G01F 1/69; G01F 1/6965; G01F 1/6986; G01F 1/6845; G01F 15/14; G01F 25/007; G01F 25/00
  See application file for complete search history.

(56) References Cited

U.S. PATENT DOCUMENTS

| 4,059,982 A * | 11/1977 | Bowman | G01F 1/68 374/44 |
| 2008/0000283 A1* | 1/2008 | Wang | G01F 1/6842 73/1.16 |

(Continued)

FOREIGN PATENT DOCUMENTS

| DE | 2077435 | * 12/1981 |
| GB | 2077435 | 12/1981 |

(Continued)

OTHER PUBLICATIONS

"Search Report of European Counterpart Application," dated Jul. 24, 2018, p. 1-p. 8.

(Continued)

*Primary Examiner* — Harshad R Patel
*Assistant Examiner* — Nigel H Plumb
(74) *Attorney, Agent, or Firm* — JCIPRNET

(57) ABSTRACT

A thermal type flow meter includes a first resistor (R1) is disposed along a flow path through which a fluid flows, generating heat when a current is applied, and outputting a first output signal indicating a heat generation temperature, a second resistor (R2) disposed at a position different from that of the first resistor along the flow path and outputting a second output signal indicating a temperature of the fluid, and a current application unit configured to apply a current to the first resistor so that the first output signal indicates a predetermined temperature. A parameter for converting the difference between the first output signal and the second output signal when a predetermined input is received if the current is applied into a target value is determined. The flow rate is acquired using the parameter, the difference detected after the parameter is determined, and a predetermined function.

12 Claims, 12 Drawing Sheets

(56) References Cited

U.S. PATENT DOCUMENTS

2011/0247390 A1* 10/2011 Smirnov ............. G01F 25/0053
73/1.16
2016/0245681 A1* 8/2016 Maginnis .............. G01F 1/6845

FOREIGN PATENT DOCUMENTS

| JP | 2007-309924 | 11/2007 |
| JP | 2010-054251 | 3/2010 |

OTHER PUBLICATIONS

"Office Action of China Counterpart Application," dated Jul. 3, 2019, with English translation thereof, pp. 1-21.

* cited by examiner

| dT/N | x1 | x2 | x3 | ... | |
|---|---|---|---|---|---|
| U1 | y1 | y2 | y3 | ... | |

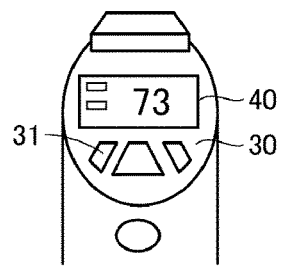 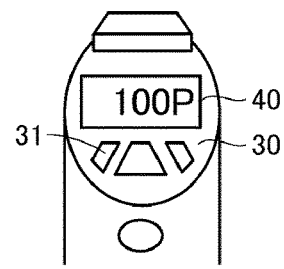 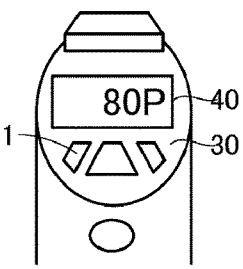
FIG. 13(A)  FIG. 13(B)  FIG. 13(C)
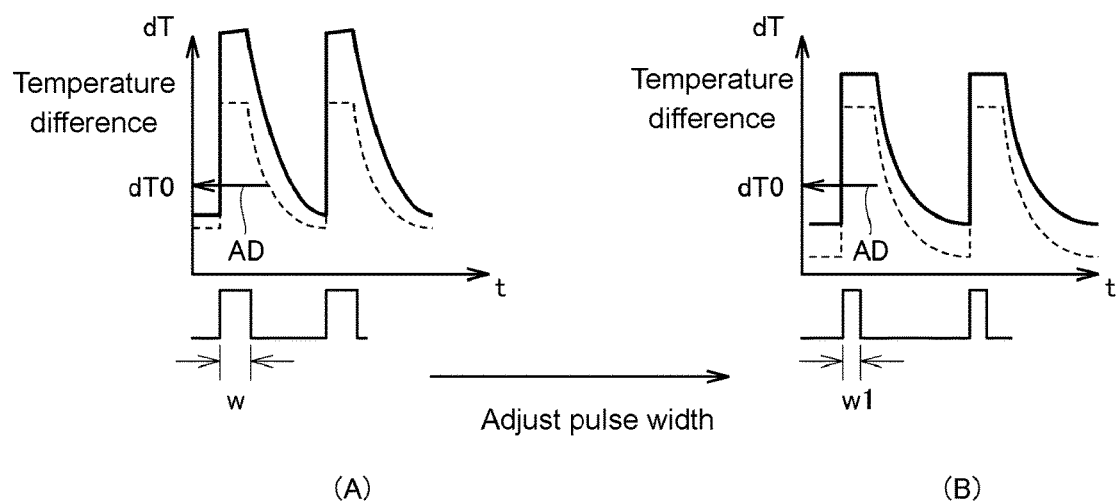
FIG. 14

THERMAL TYPE FLOW METER, FLOW RATE PROCESSING DEVICE, AND THERMAL TYPE FLOW RATE MEASUREMENT METHOD USING THE SAME

CROSS-REFERENCE TO RELATED APPLICATIONS

This application claims the priority benefit of Japanese Patent Application No. 2017-048840, filed on Mar. 14, 2017. The entirety of the above-mentioned patent application is hereby incorporated by reference herein and made a part of this specification.

BACKGROUND

Technical Field

The present disclosure relates to a thermal type flow meter, a flow rate processing device, and a thermal type flow rate measurement method, and particularly, to a thermal type flow meter configured to detect a flow rate from a temperature of a fluid, a flow rate processing device, and a thermal type flow rate measurement method.

Description of Related Art

A technology for measuring a flow velocity (flow rate) from a temperature of a fluid that flows through a flow path is disclosed in, for example, Patent Document 1 (Japanese Unexamined Patent Application Publication No. 2007-309924) and Patent Document 2 (Japanese Unexamined Patent Application Publication No. 2010-54251).

In Patent Document 1, a control unit measures a flow rate based on a signal output from a temperature sensor according to driving of a heater in low flow rate division. The flow rate is measured based on a phase difference between a signal output from a temperature sensor according to driving of a heater and a sine wave drive signal except in low flow rate division.

In Patent Document 2, a control unit periodically turns current application to a heating resistor on and off and performs driving. The control unit sets a time from a time point at which current application to the heating resistor is turned on to a predetermined time point before a temperature difference output value is maximized as a half period and calculates a voltage which is a sensor output based on an amplitude of a temperature difference output as an AC signal at that time.

There are various types of fluid according to physical characteristics thereof even among oils. Among oils, the relationship between a temperature and a flow velocity differs according to type. In order to cope with this, a sensor needs to maintain a large number of correlation functions. In this case, there are problems in that an internal memory required is large, development costs for acquiring correlation functions in advance are high, a setting performed by a user becomes complicated, it is difficult to understand an operation method of a sensor, and the like.

Therefore, there is demand from users for measuring a flow rate simply without high costs even for fluids of various types. However, in Patent Document 1 and Patent Document 2, a configuration for detecting a flow rate based on different types of fluid is not disclosed.

SUMMARY

A thermal type flow meter according to an aspect of the present disclosure includes a first resistor which is disposed along a flow path through which a fluid flows, in which heat is generated when a current is applied, and which outputs a first output signal indicating a heat generation temperature; a second resistor which is disposed at a position different from that of the first resistor along the flow path and outputs a second output signal indicating a temperature of the fluid; a current application unit configured to apply a current to the first resistor so that the first output signal indicates a predetermined temperature; an output circuit configured to output a signal regarding a flow rate of the fluid based on a difference between the first output signal output from the first resistor and the second output signal output from the second resistor; and an arithmetic unit.

The arithmetic unit includes a parameter determination unit configured to determine a parameter for converting the difference into a target value, wherein the difference is detected when a predetermined input is received in the case that the current is applied; and a flow rate acquisition unit configured to acquire the flow rate using the parameter, the difference detected after the parameter is determined, and a predetermined function.

According to another aspect of the present disclosure, there is provided a flow rate processing device in which a sensor unit including a first resistor which is disposed along a flow path through which a fluid flows, in which heat is generated when a current is applied, and which outputs a first output signal indicating a heat generation temperature and a second resistor which is disposed at a position different from that of the first resistor along the flow path and outputs a second output signal indicating a temperature of the fluid is able to be connected, the flow rate processing device including a current application unit configured to apply a current to the first resistor so that the first output signal indicates a predetermined temperature; an output circuit configured to output a signal regarding a flow rate of the fluid based on a difference between the first output signal output from the first resistor and the second output signal output from the second resistor; and an arithmetic unit.

The arithmetic unit includes a parameter determination unit configured to determine a parameter for converting the difference into a target value, wherein the difference is detected when a predetermined input is received in the case that the current is applied; and a flow rate acquisition unit configured to acquire the flow rate using the parameter, the difference detected after the parameter is determined, and a predetermined function.

According to still another aspect of the present disclosure, there is provided a thermal type flow rate measurement method using a device including a first resistor which is disposed along a flow path through which a fluid flows, in which heat is generated when a current is applied, and which outputs a first output signal indicating a heat generation temperature; a second resistor which is disposed at a position different from that of the first resistor along the flow path and outputs a second output signal indicating a temperature of the fluid; a current application unit configured to apply a current to the first resistor so that the first output signal indicates a predetermined temperature; and an output circuit configured to output a signal regarding a flow rate of the fluid based on a difference between the first output signal output from the first resistor and the second output signal output from the second resistor.

The thermal type flow rate measurement method includes determining a parameter for converting the difference into a target value, wherein the difference is detected when a predetermined input is received in the case that the current is applied; and acquiring the flow rate using the parameter, the difference detected after the parameter is determined, and a predetermined function.

BRIEF DESCRIPTION OF THE DRAWINGS

FIG. 13 (A) to FIG. 13(C) show diagrams showing a display example according to an embodiment.

FIG. 14 shows diagrams for explaining a modified example of the embodiment.

DESCRIPTION OF THE EMBODIMENTS

Figure 1:
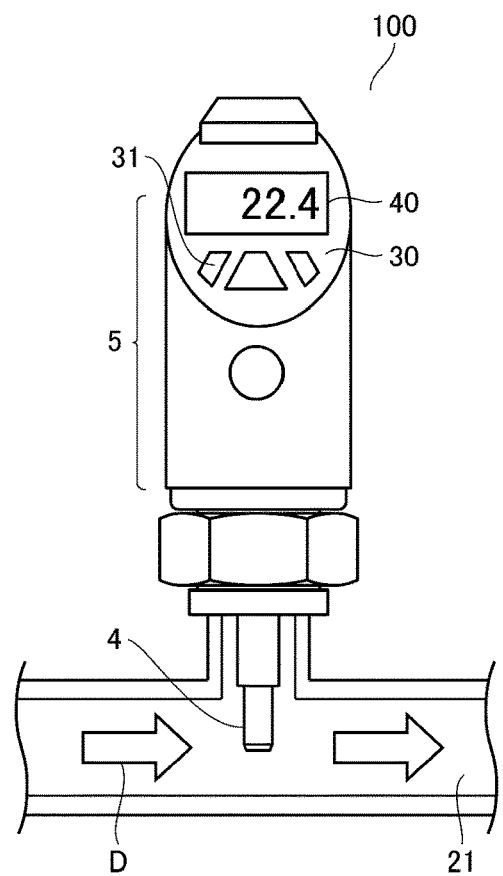
FIG. 1 is a diagram showing an appearance and a usage state of a thermal type flow rate sensor 100 according to an embodiment.

The present disclosure provides a thermal type flow meter configured to detect a flow rate simply even if types of fluid are different, a flow rate processing device and a thermal type flow rate measurement method.

According to an embodiment of the disclosure, a thermal type flow meter includes a first resistor which is disposed along a flow path through which a fluid flows, in which heat is generated when a current is applied, and which outputs a first output signal indicating a heat generation temperature; a second resistor which is disposed at a position different from that of the first resistor along the flow path and outputs a second output signal indicating a temperature of the fluid; a current application unit configured to apply a current to the first resistor so that the first output signal indicates a predetermined temperature; an output circuit configured to output a signal regarding a flow rate of the fluid based on a difference between the first output signal output from the first resistor and the second output signal output from the second resistor; and an arithmetic unit.

The arithmetic unit includes a parameter determination unit configured to determine a parameter for converting the difference into a target value, wherein the difference is detected when a predetermined input is received in the case that the current is applied; and a flow rate acquisition unit configured to acquire the flow rate using the parameter, the difference detected after the parameter is determined, and a predetermined function.

Preferably, the target value consists of a value according to a reference relationship that defines a reference for the relationship between the difference and the flow rate.

Preferably, the current application unit periodically turns current application to the first resistor on and off, and the parameter has a value indicating a current application on or current application off time in each period.

Preferably, the flow rate acquisition unit calculates the flow rate according to the predetermined function using the difference and the parameter.

Preferably, the thermal type flow meter includes a table including the flow rate which is associated with each set of the difference and the parameter and calculated according to the predetermined function using the difference and the parameter of the set, and the flow rate acquisition unit reads the corresponding flow rate from the table based on a set including the determined parameter and the difference detected after the parameter is determined.

Preferably, the arithmetic unit additionally calculates the flow rate according to a correlation function between a difference and a flow rate based on a difference between the first output signal output from the first resistor and the second output signal output from the second resistor.

Preferably, the thermal type flow meter further includes an accommodation unit in which the first resistor and the second resistor are accommodated and which is able to be disposed along the flow path, and the accommodation unit includes a metal material surface that is exposed to a fluid when disposed along the flow path and a metal material bonding part that bonds the first resistor and the second resistor on a rear surface of the surface.

According to an embodiment of the disclosure, there is provided a flow rate processing device in which a sensor unit including a first resistor which is disposed along a flow path through which a fluid flows, in which heat is generated when a current is applied, and which outputs a first output signal indicating a heat generation temperature and a second resistor which is disposed at a position different from that of the first resistor along the flow path and outputs a second output signal indicating a temperature of the fluid is able to be connected, the flow rate processing device including a current application unit configured to apply a current to the first resistor so that the first output signal indicates a predetermined temperature; an output circuit configured to output a signal regarding a flow rate of the fluid based on a difference between the first output signal output from the first resistor and the second output signal output from the second resistor; and an arithmetic unit.

The arithmetic unit includes a parameter determination unit configured to determine a parameter for converting the difference into a target value, wherein the difference is detected when a predetermined input is received in the case that the current is applied; and a flow rate acquisition unit configured to acquire the flow rate using the parameter, the difference detected after the parameter is determined, and a predetermined function.

According to an embodiment of the disclosure, there is provided a thermal type flow rate measurement method using a device including a first resistor which is disposed along a flow path through which a fluid flows, in which heat is generated when a current is applied, and which outputs a first output signal indicating a heat generation temperature;

a second resistor which is disposed at a position different from that of the first resistor along the flow path and outputs a second output signal indicating a temperature of the fluid; a current application unit configured to apply a current to the first resistor so that the first output signal indicates a predetermined temperature; and an output circuit configured to output a signal regarding a flow rate of the fluid based on a difference between the first output signal output from the first resistor and the second output signal output from the second resistor.

The thermal type flow rate measurement method includes determining a parameter for converting the difference into a target value, wherein the difference is detected when a predetermined input is received in the case that the current is applied; and acquiring the flow rate using the parameter, the difference detected after the parameter is determined, and a predetermined function.

According to the present disclosure, it is possible to detect a flow rate simply even if types of fluid are different.

Embodiments will be described below with reference to the drawings. In the following description, the same elements and components will be denoted by the same reference numerals. Names and functions thereof are the same. Therefore, details thereof will not be repeated.

(Overview)

In the present disclosure, a first resistor and a second resistor disposed along a flow path of a fluid are used. The first resistor maintains a predetermined temperature due to self-heating when a current is applied, and outputs a signal indicating a temperature corresponding to a flow velocity during measurement. The second resistor outputs a signal indicating a (substantially constant) temperature of a fluid. A thermal type flow rate sensor acquires a difference between outputs (measurement temperatures) from both the first resistor and the second resistor, derives a parameter for converting the difference into a target value, and detects a flow rate according to a predetermined function using the parameter. Therefore, the thermal type flow rate sensor can cancel out differences between characteristics (types) of fluid according to parameters and detect flow rates of various types of fluid.

(Appearance)

FIG. 1 is a diagram showing an appearance and a usage state of a thermal type flow rate sensor 100 according to an embodiment. The thermal type flow rate sensor 100 is an example of a "thermal type flow meter" and is used to measure and monitor a flow rate of a fluid in a processing facility used for, for example, factory automation (FA). Here, in the embodiment, the term "flow velocity" may be used to represent a flow rate. The "flow velocity" is a value that can be converted into a "flow rate" by multiplying by a cross-sectional area of a flow path, and the two values have a correlation.

Referring to FIG. 1, the thermal type flow rate sensor 100 includes a probe 4 corresponding to a "sensor unit" that can be inserted into and removed from a pipe corresponding to a flow path of a fluid 21 and a main body 5 corresponding to a "flow rate processing device." The probe 4 includes a cylindrical steel pipe 3 having a hollow inside and may be detachably attached to the main body 5. The main body 5 includes a display unit 40 configured to display information including detection or measurement results and an operation unit 30 configured to receive an operation from a user. The operation unit 30 includes a one touch tuning button 31 to be described below.

Referring to FIG. 1, the probe 4 is inserted into a pipe so that a virtual axis that extends in the longitudinal direction is orthogonal to a virtual axis (axis of an arrow D) that extends in a direction in which the fluid 21 in the pipe flows. Here, the insertion state is not limited to the orthogonal state, and may be a cross state.

Figure 2:
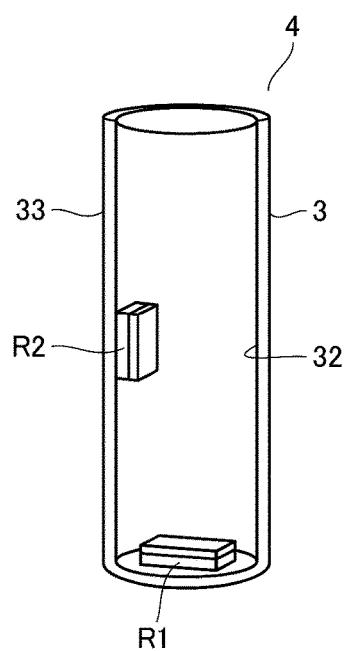
FIG. 2 is a diagram schematically showing the inside of a probe 4 according to an embodiment.

FIG. 2 is a diagram schematically showing the inside of the probe 4 according to an embodiment. The probe 4 includes a first resistor R1 and a second resistor R2 made of, for example, platinum, which are disposed at different positions on an inner circumferential surface 32 of the steel pipe 3. The first resistor R1 is configured to perform both heat generation and temperature measurement, and the second resistor R2 is configured to perform only temperature measurement. Here, for temperature measurement, the second resistor R2 is disposed at a position at which there is no influence from self-heating of the first resistor R1. While the probe 4 is inserted into the pipe, an outer circumferential surface 33 of the steel pipe 3 is exposed to the fluid 21, and heat is transferred between resistors (the first resistor R1 and the second resistor R2) and the fluid 21 through the inner circumferential surface 32 and the outer circumferential surface 33.

The thermal type flow rate sensor 100 performs control such that a current is supplied to the first resistor R1, and the first resistor R1 is self-heated and has a higher temperature than the surroundings. However, due to the above heat transfer, a measurement temperature of the first resistor R1 decreases according to an increase in the flow velocity of the fluid 21. On the other hand, a measurement temperature of the second resistor R2 indicates a (substantially constant) temperature of the fluid 21. As a result, there is a difference between measurement temperatures of the first resistor R1 and the second resistor R2. The thermal type flow rate sensor 100 determines a parameter for converting the difference into a target value using a target value according to a reference relationship which defines a reference for the relationship between a measurement temperature difference and a flow rate. Thereafter, the flow rate is acquired using the detected difference, the determined parameter, and a predetermined function for calculating a flow rate.

In the embodiment, platinum having favorable temperature characteristics changing little over time is used for the first resistor R1 and the second resistor R2, but the material is not limited thereto. In addition, the type of the fluid 21 includes, for example, water, an oil, and an antifreeze, but the present disclosure is not limited to these types.

(Configuration)

Figure 3:
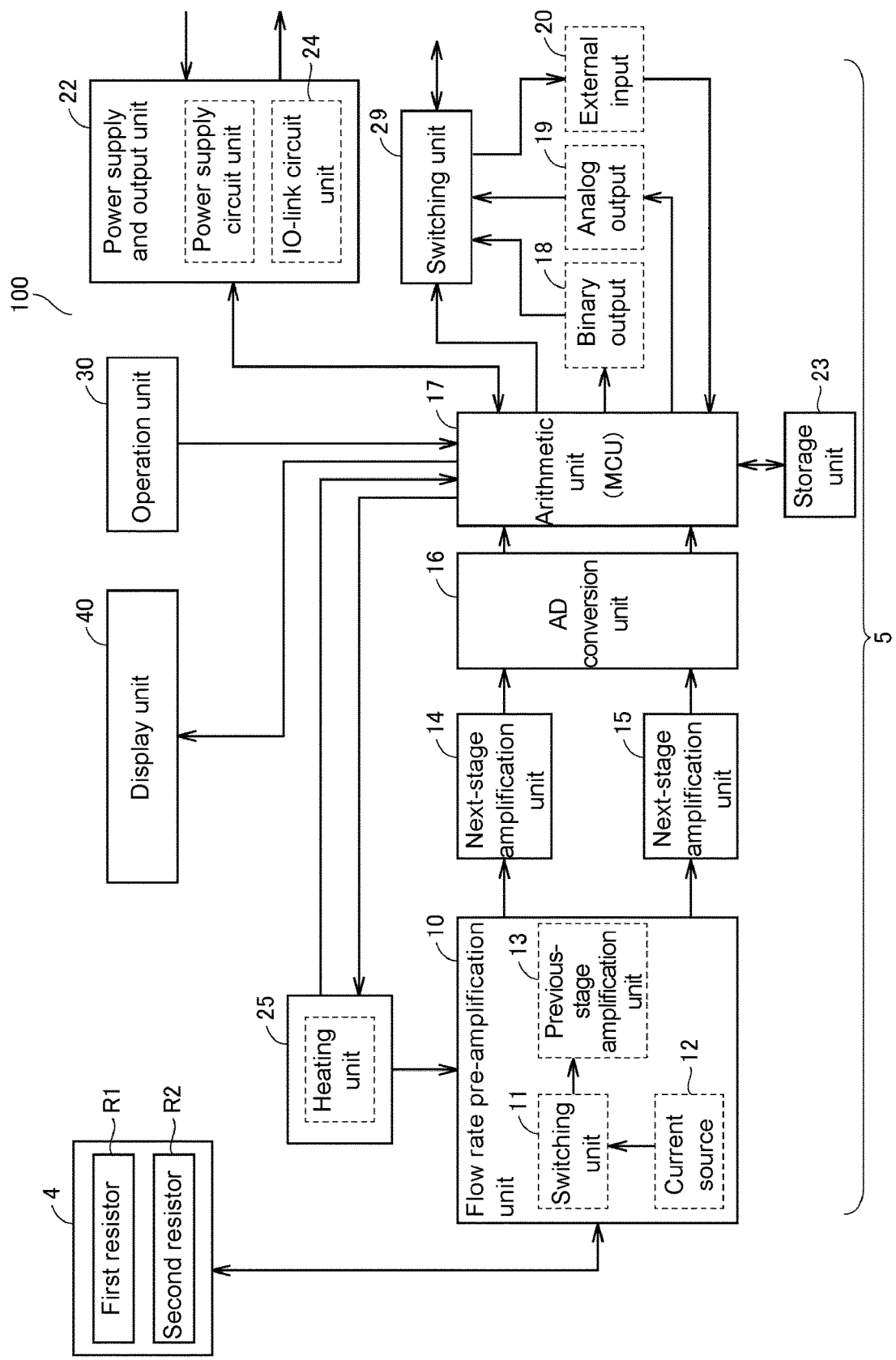
FIG. 3 is a block diagram of the thermal type flow rate sensor 100 according to the embodiment.

FIG. 3 is a block diagram of the thermal type flow rate sensor 100 according to the embodiment. Referring to FIG. 3, the main body 5 includes a flow rate pre-amplification unit 10 connected to the first resistor R1 and the second resistor R2 of the probe 4, next-stage amplification units 14 and 15, an analog to digital (AD) conversion unit 16, an arithmetic unit 17 including a micro control unit (MCU), a storage unit 23 including an electrically erasable programmable read-only memory (EEPROM), an input and output switching unit 29, a power supply and output unit 22, a heating unit 25, the operation unit 30, and the display unit 40. The input and output switching unit 29 switches between an external input 20 from an external device and an output (a binary output 18 and an analog output 19) from the arithmetic unit 17.

The power supply and output unit 22 includes a power supply circuit unit configured to supply power to components of the then al type flow rate sensor 100 and an IO-Link circuit unit 24 which is an example of a circuit unit communicating to the outside. The output unit of the binary output 18 and the analog output 19, the IO-Link circuit unit 24, the display unit 40, and the like constitute an "output circuit" configured to output a signal regarding a flow rate of a fluid.

The heating unit 25 outputs a heating signal according to an instruction from the arithmetic unit 17 to the flow rate pre-amplification unit 10 in order to control self-heating of the first resistor R1. The heating signal is used to determine a pulse width (duty ratio) of a current signal output to the first resistor R1 from a current source 12 (to be described below) of the flow rate pre-amplification unit 10.

The flow rate pre-amplification unit 10 includes a switching unit 11, the current source 12 and a previous-stage amplification unit 13. The flow rate pre-amplification unit 10 converts an output (resistance value) corresponding to a measurement temperature of the first resistor R1 and the second resistor R2 into a voltage, and outputs the converted voltage to the previous-stage amplification unit 13. The previous-stage amplification unit 13 amplifies the output voltages of the first resistor R1 and the second resistor R2 and outputs the amplified voltages to the AD conversion unit 16 through the next-stage amplification units 14 and 15. The AD conversion unit 16 converts the voltage amplified by the next-stage amplification units 14 and 15 into digital data and outputs the converted data to the arithmetic unit 17.

The arithmetic unit 17 processes data indicating the measurement temperature of the first resistor R1 and the second resistor R2. In addition, the processing result is output to the outside through the display unit 40, the IO-Link circuit unit 24, and the input and output switching unit 29.

The switching unit 11 of the flow rate pre-amplification unit 10 performs switching so that the first resistor R1 is connected to either the current source 12 or the previous-stage amplification unit 13 in synchronization with a pulse period according to the above heating signal. When the current source 12 is connected to the first resistor R1 according to switching, a pulse current that is subjected to pulse-width modulation according to the above heating signal from the current source 12 is output to the first resistor R1. Heat is generated in the first resistor R1 when a pulse current is supplied. On the other hand, when the previous-stage amplification unit 13 is connected to the first resistor R1, an output of the temperature measurement from the first resistor R1 is provided to the previous-stage amplification unit 13.

(Measurement Method)

Figure 4:
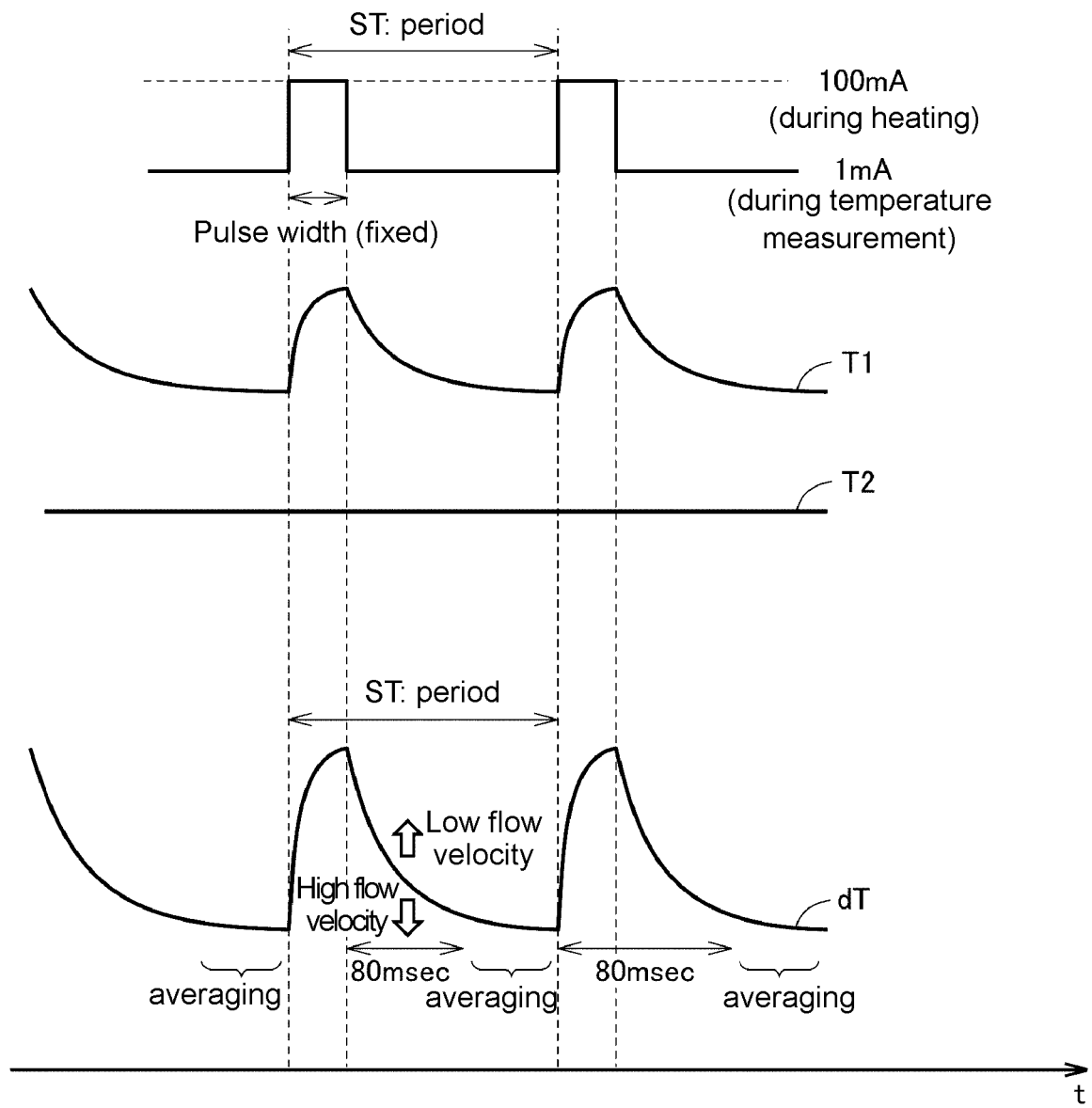
FIG. 4 is a diagram schematically showing the relationship between a supply current of a first resistor R1 and a measurement temperature according to an embodiment.

FIG. 4 is a diagram schematically showing the relationship between a supply current of the first resistor R1 and a measurement temperature according to an embodiment. Referring to FIG. 4, a current of a pulse period ST indicated by a heating signal from the heating unit 25 is supplied to the first resistor R1 from the flow rate pre-amplification unit 10. The flow rate pre-amplification unit 10 and the heating unit 25 are an example of a "current application unit" configured to periodically turn current application to the first resistor R1 on and off. A measurement temperature T1 of the first resistor R1 periodically varies in synchronization with the pulse period ST and is stable at a predetermined temperature due to self-heating during current application. On the other hand, a measurement temperature T2 of the second resistor R2 is constant (substantially the same as the temperature of the fluid 21). During measurement, a constant current (in FIG. 4, for example, 1 mA) is supplied to the first resistor R1 and the second resistor R2 by the flow rate pre-amplification unit 10, and the arithmetic unit 17 derives a temperature difference (difference between measurement temperatures) dT according to a resistance difference which is a difference between both output signals detected at that time. Therefore, a temperature difference dT which is a difference between the measurement temperatures T1 and T2 changes according to an increase and decrease in the flow velocity of the fluid 21, and does not depend on the temperature of the fluid 21.

Here, in the embodiment, a temperature difference is derived from the resistance difference indicated by output signals of the first resistor R1 and the second resistor R2. However, the present disclosure is not limited to this resistance difference, and the temperature difference may be derived from a voltage drop difference or an electromotive force difference as long as it is a value indicating a temperature difference.

In each pulse period, a current application on (high) level and a current application off (low) level are 100 mA and 1 mA, respectively. The on current value (100 mA) is a value at which the first resistor R1 may be self-heated, and the off current value (1 mA) is a value for temperature measurement.

In FIG. 4, the temperature difference dT is derived in a duration from a time point at which current application to the first resistor R1 is turned on to a time point before an output value of the temperature difference dT is maximized. For example, when the pulse period ST in FIG. 4 is assumed to be about 160 msec, the temperature difference dT is derived in a duration (about 60 msec) from when a predetermined time, for example, 80 msec, has elapsed after a current application on interval ends to 140 msec thereafter. Here, the pulse period ST and the predetermined time are not limited to such values, and they may be acquired by, for example, experiments, depending on characteristics of devices.

(Functional Configuration)

Figures 5A, 5B:
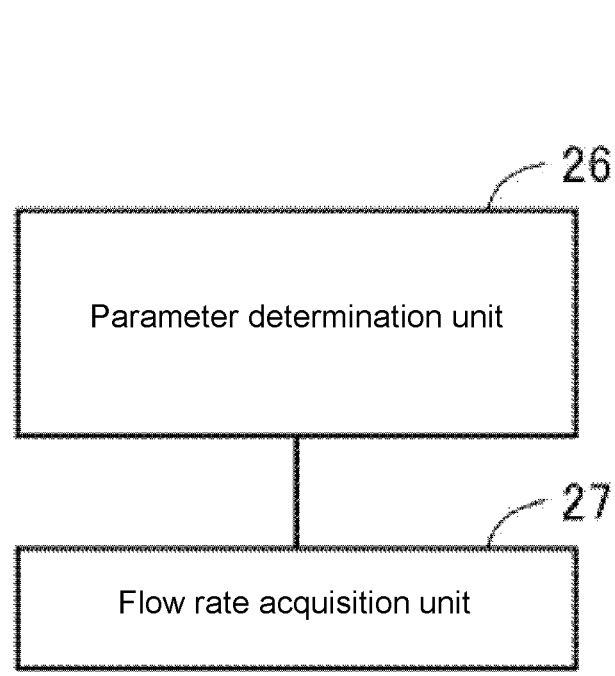
FIG. 5(A) and FIG. 5(B) show diagrams schematically showing a functional configuration for an arithmetic unit 17 measuring a flow rate according to an embodiment.

FIG. 5(A) and FIG. 5(B) shows diagrams schematically showing a functional configuration for the arithmetic unit 17 measuring a flow rate according to an embodiment. Referring to FIG. 5(A), the arithmetic unit 17 includes a parameter determination unit 26 configured to determine a parameter (parameter value) according to a type of a fluid for flow rate measurement using a temperature difference dT and a reference relationship to be described below and a flow rate acquisition unit 27 configured to acquire a flow rate according to a predetermined function using a temperature difference dTm and parameters. FIG. 5(B) schematically shows a table 28 that the flow rate acquisition unit 27 searches in order to acquire a flow rate. The table 28 is stored in the storage unit 23. Details of the units will be described below.

(Reference Relationship)

Figure 6:
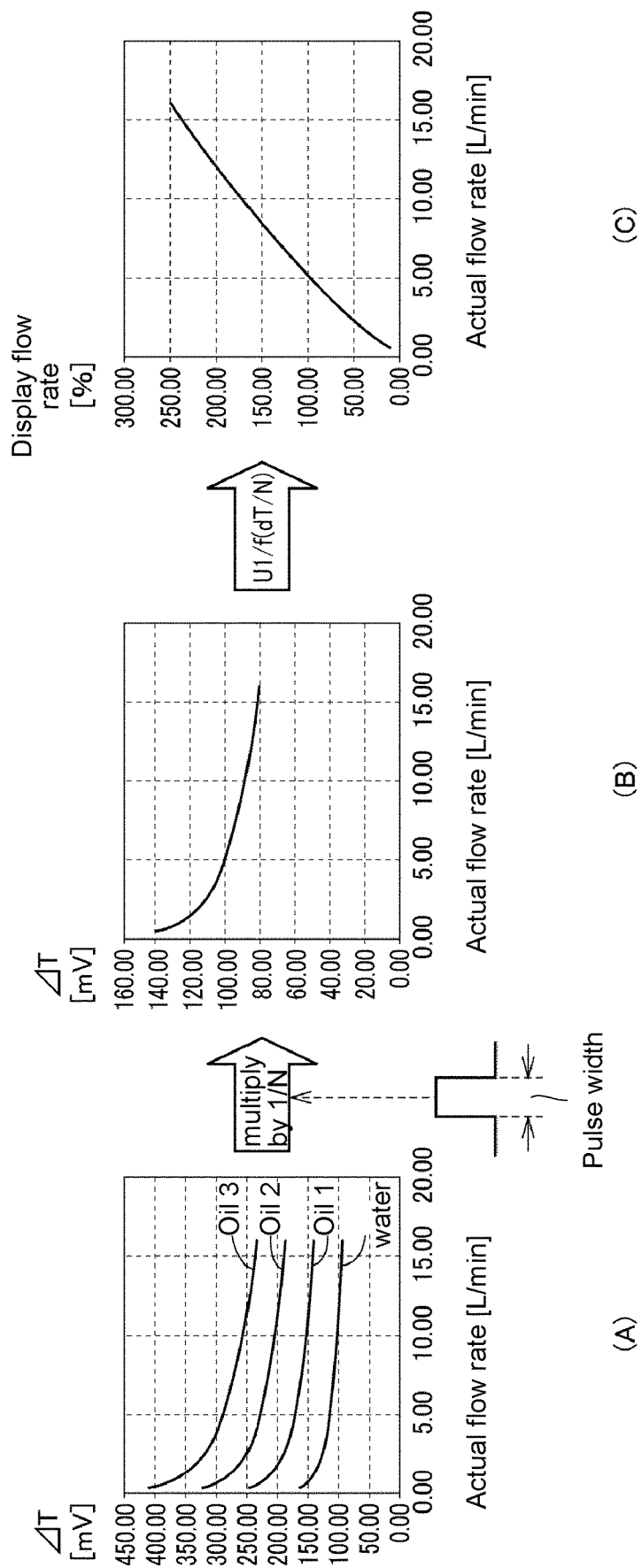
FIG. 6 shows diagrams schematically showing a procedure of deriving a flow rate using a reference relationship according to an embodiment.

FIG. 6 shows diagrams schematically showing a procedure of deriving a flow rate using a reference relationship according to an embodiment. As shown in (A) of FIG. 6, the relationship between a flow rate and a temperature difference differs depending on the type (such as water and oil) of the fluid 21. However, a correlation function f between a temperature difference dT and a flow velocity U' is generally represented by $dT = a - b \times \sqrt{U} + c \times U$ (King's rule), and coefficients a, b, and c are determined by the type of the fluid 21. Therefore, when flow rates of fluids of different types are converted using the same equation, it is difficult to obtain a flow rate change signal in some cases.

Therefore, in the embodiment, the flow velocity is derived using a reference relationship (refer to (B) of FIG. 6) that defines a reference for the relationship between the temperature difference dT and the flow velocity (flow rate). Specifically, when the one touch tuning button 31 is pressed in the state in FIG. 1, the parameter determination unit 26 determines a value of a conversion parameter N so that the acquired temperature difference dT becomes a target value d0 according to the reference relationship. In the embodiment, the parameter N may indicate a value corresponding to a pulse width (a length of a current application on time) of a pulse period. When the pulse width is adjusted using the parameter N, even in fluids 21 of different types, a correlation between the flow rate and the temperature difference dT can be approximated to the reference relationship indicated by a curve (refer to (B) of FIG. 6). Then, the flow rate acquisition unit 27 calculates a flow rate according to a correlation function f using the parameter N and the temperature difference dT. While the relationship between the calculated flow rate (a display flow rate U1) and an actual flow rate is somewhat nonlinear (refer to (C) of FIG. 6), the display flow rate U1 to be displayed on the display unit 40 configured to display a change in the flow rate can be derived.

Here, in the embodiment, the value of the parameter N corresponds to the length (pulse width) of the current application on time. However, when the pulse period is constant, the parameter N may be a length of a current application off time.

(Method of Acquiring Flow Rate Using Parameters)

A specific method of deriving a display flow rate U1 independently from the type of the fluid 21 will be described with reference to FIG. 6.

The user uses the thermal type flow rate sensor 100 shown in FIG. 1 and presses the one touch tuning button 31 when a flow rate of the fluid 21 whose level of a flow rate is to be determined is near an intermediate level (for example, an intermediate between a maximum flow rate and a minimum flow rate). A value of a pulse width at this time is stored in the storage unit 23.

When the one touch tuning button 31 is pressed, the parameter determination unit 26 of the arithmetic unit 17 determines a parameter (parametric variable) for converting the temperature difference dT into a display flow rate U1 (unit: %) of the flow rate. Specifically, using the detected temperature difference dT and the target value d0, the value of the parameter N is calculated so that the temperature difference dT becomes the target value d0 according to (d0=dT/N), and the result is stored in the storage unit 23.

For example, in the case in which the target value d0 is 100 mV and an oil 1 flows at 5 L/min, the temperature difference dT=about 175 mV is detected in (A) of FIG. 6. The parameter determination unit 26 can determine that N=1.74 from the temperature difference dT and the target value d0 according to (d0=dT/N). Here, the parameter N is (0<N).

When the parameter N is determined, the flow rate acquisition unit 27 acquires the flow rate U1 according to the correlation function f with respect to (dT/N) obtained by multiplying the temperature difference dT by 1/N. The flow rate U1 is a flow rate for display. An amount of increase or decrease from an actual flow rate when the one touch tuning button 31 is pressed is indicated by a relative displacement (unit: %) from the actual flow rate. Therefore, it is possible to determine the parameter N using the target value d0 according to the reference relationship in (B) of FIG. 6 independently from the type of the fluid, and it is possible to determine the flow rate U1 ((C) of FIG. 6) according to the determined parameter N and the temperature difference dT.

Therefore, even if values of a large number of correlation functions corresponding to types of fluid are not maintained in the storage unit 23 of the thermal type flow rate sensor 100, it is possible to derive the flow rate U1. Accordingly, it is possible to reduce memory consumption of the thermal type flow rate sensor 100, simplify a data structure, and reduce costs for elements and development processes.

(Type of Parameter N)

In the embodiment, when the parameter N is used, it is possible to cancel out an influence (such as thermal conductivity) according to the type of the fluid 21 and perform measurement.

In the embodiment, in order to derive the parameter N, any method among Method 1 (adjustment of a pulse width), Method 2 (an arithmetic operation by the arithmetic unit 17), and Method 3 (an analog arithmetic operation by a circuit) can be applied.

First, in the case of Method 1 (adjustment of a pulse width), the flow rate acquisition unit 27 outputs an instruction to the heating unit 25 so that a heating signal for adjusting (changing) a pulse width (current application on time) to 1/N of a pulse width when the one touch tuning button 31 is pressed is output. In this case, the parameter N corresponds to a heat amount necessary for changing the temperature difference dT to the target value d0, and the value dT/N may indicate a change in temperature with respect to an input heat amount, that is, a thermal conductivity specific to the type of the fluid 21. Therefore, the flow rate acquisition unit 27 can acquire the flow rate U1 with no influence according to the type (thermal conductivity) of the fluid 21.

In addition, in the case of Method 2 (an arithmetic operation by the arithmetic unit 17), the arithmetic unit 17 calculates a parameter N so that the value dT/N becomes a target value corresponding to the reference relationship, and stores the result in the storage unit 23. Then, the flow rate acquisition unit 27 acquires the flow rate U1 based on the value obtained by multiplying the detected temperature difference dT by 1/N.

In addition, in the case of Method 3 (an analog arithmetic operation by a circuit), for example, a temperature difference detection circuit (not shown) multiplies the temperature difference dT of an analog amount by 1/N using the parameter N of the storage unit 23, and outputs a subsequent voltage to the arithmetic unit 17 through the AD conversion unit 16. Then, the flow rate acquisition unit 27 acquires the flow rate U1 based on the detected temperature difference dT.

In the present embodiment, Method 1 among Method 1 to Method 3 is used. According to Method 1, derivation can be performed by simple signal processing for adjusting a pulse width without a complicated circuit configuration. Alternatively, Method 2 or Method 3 may be used. In addition, the flow rate U1 may be derived by a combination of two or more methods. In this case, a representative value (for example, an average value and a median value) of the flow rate U1 derived by each of the methods may be determined as a display value.

In addition, the flow rate acquisition unit 27 calculates and acquires the display flow rate U1 according to the correlation function f using the value (dT/N). However, the acquisition method is not limited thereto, and may be a method of searching the table 28 in FIG. 5(B). In the table 28, a plurality of difference values (dt/N), and a calculation value (the display flow rate U1) according to the correlation function f using the value (dT/N) associated with each difference value are stored. The flow rate acquisition unit 27 may search the table 28 based on the detected temperature difference dT and read and acquire the corresponding display flow rate U1.

(Absolute Display Mode)

An operation mode of the thermal type flow rate sensor 100 includes a relative display mode in which the above-described relative flow rate U1 is displayed and an absolute display mode in which a flow rate of the fluid 21 is actually measured and displayed. Regarding the absolute display mode, for example, a case in which a flow rate of water as the fluid 21 is measured will be described.

Figure 7:
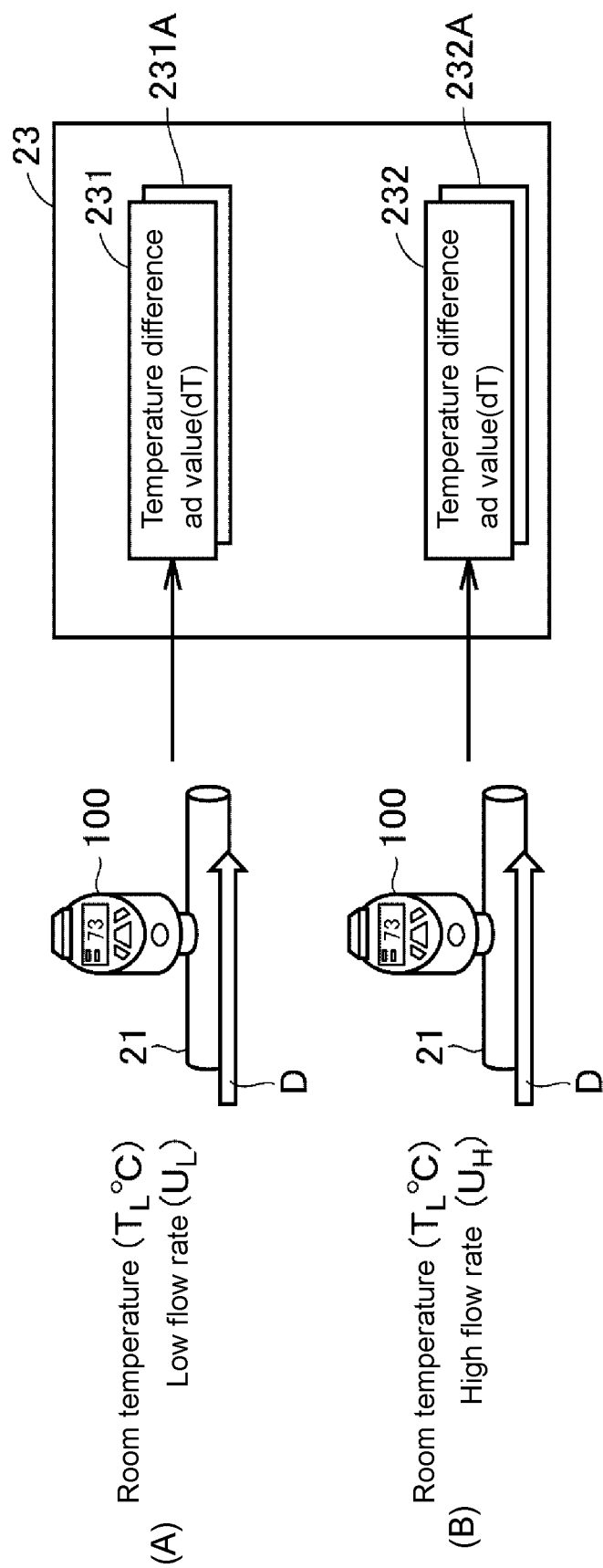
FIG. 7 shows diagrams schematically showing a procedure of acquiring coefficients for an absolute display mode according to an embodiment.

FIG. 7 shows diagrams schematically showing a procedure of acquiring coefficients for the absolute display mode according to an embodiment. First, such coefficients are acquired during a sensor design and during sensor production.

When the thermal type flow rate sensor 100 is designed, regarding water as the fluid 21, a correlation equation between the temperature difference dT and the flow velocity U' is represented by $dT=a-b\times\sqrt{U}+c\times U$, values of coefficients a, b, and c being acquired and stored in the storage unit 23.

In addition, a temperature difference dT when the fluid 21 is (A) at a constant temperature (room temperature $T_L$ ° C.) and has a low flow rate $U_L$, and a temperature difference dT when the fluid 21 is (B) at the constant temperature (room temperature $T_L$ ° C.) and has a high flow rate $U_H$ are measured and stored in the storage unit 23 as a value 231 and a value 232, respectively.

In addition, for each individual sensor before sensor production and shipping, a temperature difference dT when the fluid 21 is at the above constant temperature (room temperature $T_L$ ° C.) and has a low flow rate $U_L$ and a temperature difference dT when the fluid 21 is at the constant temperature and has a high flow rate $U_H$ are measured, and stored in the storage unit 23 as a value 231A and a value 232A, respectively.

Figure 8:
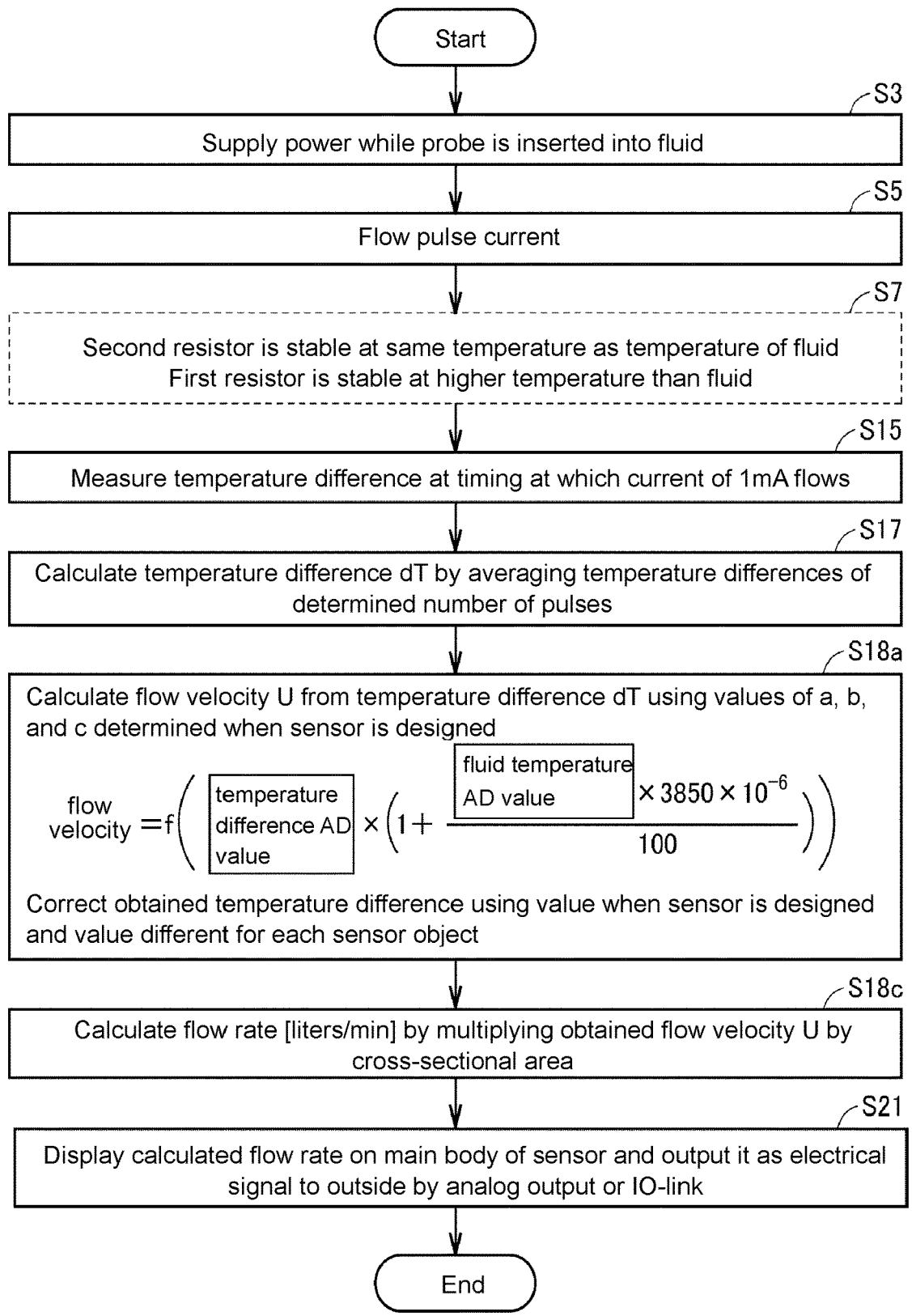
FIG. 8 is a flowchart of processes in an absolute display mode according to an embodiment.

FIG. 8 is a flowchart of processes in an absolute display mode according to an embodiment. A case in which a flow rate (unit: liters/min) of water is acquired and displayed will be described with reference to FIG. 8. Here, measurement is performed while the probe 4 is inserted into the pipe as shown in FIG. 1. First, the arithmetic unit 17 supplies power to components according to power-on operation details received from the operation unit 30 (Step S3).

The arithmetic unit 17 outputs an instruction to the heating unit 25 so that a heating signal for supplying a pulse current is output to the first resistor R1 (Step S5). According to the pulse current, a current of 100 mA and a current of 1 mA shown in FIG. 4 are alternately supplied to the first resistor R1, and heat may be generated in the first resistor R1.

When the pulse current is supplied and the first resistor R1 is self-heated, a measurement temperature T1 of the first resistor R1 is stable at a predetermined temperature and the measurement temperature T2 of the second resistor R2 is stable at a temperature that is substantially the same as the temperature of the fluid 21 (Step S7).

The arithmetic unit 17 acquires a temperature difference between the measurement temperature T1 acquired at a timing at which a current of 1 mA flows when current application to the first resistor R1 is turned off and the measurement temperature T2 of the second resistor R2 (Step S15). This timing is a timing when a predetermined time has elapsed after current application being on at 100 mA ends.

The arithmetic unit 17 sets an average of M temperature differences obtained when M pulses are supplied to the first resistor R1 as the temperature difference dT (Step S17). While the average value is used here, the present disclosure is not limited to the average value as long as it is a representative value of M temperature differences.

The arithmetic unit 17 reads values of coefficients a, b, and c determined in advance when a sensor is designed from the storage unit 23 and calculates the flow velocity U' from these coefficients and the temperature difference dT according to the correlation function f (Step S18a). In this case, a value corrected using the values 231, 232, 231A, and 232A of the storage unit 23 is used as the temperature difference dT.

Here, when the ambient temperature is different, heat energy changes according to resistance temperature characteristics of the first resistor R1. Therefore, in calculation using the correlation function f, an influence of the resistance temperature characteristics of the first resistor R1 is corrected by the following equation.

Flow velocity $U'=f(dT\times(1+(\text{the measurement temperature } T2\times3850\times10^6/100)))$ The arithmetic unit 17 calculates a flow rate (liters/min) by multiplying the calculated flow velocity U' by a cross-sectional area of the pipe (Step S18c). The arithmetic unit 17 displays the calculated flow rate on the display unit 40 or outputs the calculated flow rate as an analog output 19 to the outside through the input and output switching unit 29. In addition, the calculated flow rate is transmitted to the outside through the IO-Link circuit unit 24 (Step S21).

In this manner, in the absolute display mode, it is possible to display the actually measured flow rate (actual flow rate) of the fluid 21.

(Relative Display Mode)

In addition, in the relative display mode of the present embodiment, the thermal type flow rate sensor 100 acquires and displays the display flow rate U1 matched with the actual flow rate U1 using the above parameter N (parametric variable).

Figure 9:
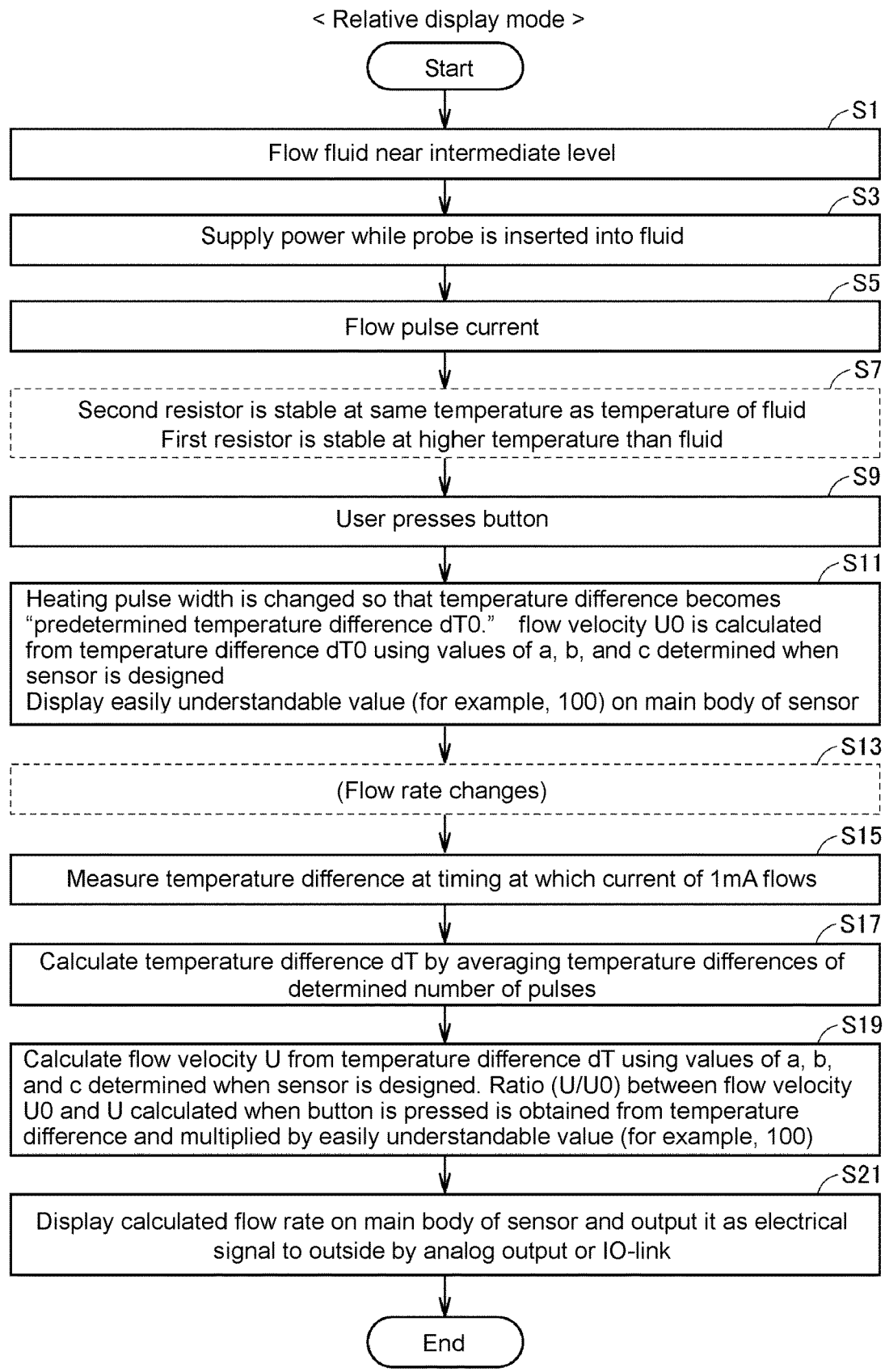
FIG. 9 is a flowchart of processes in a relative display mode according to an embodiment.

FIG. 9 is a flowchart of processes in a relative display mode according to an embodiment. Since processes of Steps S3 to S7 and S15, S17, and S21 in FIG. 9 are the same processes as the steps in FIG. 8, detailed descriptions thereof will not be repeated.

Referring to FIG. 9, first, a flow rate of the fluid 21 to be detected that flows through the pipe is adjusted to near an intermediate level (Step S1).

Next, while the probe 4 is inserted into the pipe as shown in FIG. 1, power is supplied to components of the thermal type flow rate sensor 100 (Step S3). The arithmetic unit 17 performs control such that the heating unit 25 supplies a pulse current in FIG. 4 to the first resistor R1 (Step S5). The first resistor R1 to which a pulse current is supplied is self-heated, the measurement temperature T1 is stable at a predetermined temperature, and the measurement temperature T2 of the second resistor R2 is stable at a temperature that is substantially the same as the temperature of the fluid 21 (Step S7). The predetermined temperature is, for example, a temperature that is different from the temperature of the fluid 21.

When the user presses the one touch tuning button 31, the arithmetic unit 17 receives operation details (pressing of the one touch tuning button 31) from the operation unit 30 (Step S9).

When the arithmetic unit 17 receives the above operation details, the parameter determination unit 26 acquires the parameter N according to the procedures described above, and then the flow rate acquisition unit 27 calculates U0=f(dT/N). For example, the display flow rate U0 may be calculated as 100%. The display flow rate U0 is a value (100%) proportional to a target value according to the reference relationship. The arithmetic unit 17 stores the parameter N and the flow rate U0 in the storage unit 23. In addition, the flow rate U0 is displayed on the display unit 40 (Step S11). Then, the flow rate in the pipe may change (Step S13).

The arithmetic unit 17 acquires a temperature difference between the measurement temperature T1 and the measurement temperature T2 when current application to the first resistor R1 is off (a timing at which a pulse signal with a current of 1 mA flows) (Step S15).

The arithmetic unit 17 acquires the temperature difference dT which is an average value of M temperature difference values obtained by supplying M pulses to the first resistor R1 (Step S17). While the average value is used here, the present disclosure is not limited to the average value as long as it is a representative value of M temperature differences.

The flow rate acquisition unit 27 calculates a flow rate U from the temperature difference dT according to the correlation function f using values of coefficients a, b, and c determined when a sensor is designed. In addition, using the flow rate U0 and the flow rate U calculated in Step S11, a percentage (unit: %) of increase and decrease in the flow rate is calculated according to (U/U0×100) (Step S19).

The arithmetic unit 17 displays the value calculated in Step S19 on the display unit 40 or outputs it as the analog output 19 to the outside through the input and output switching unit 29. In addition, the value is transmitted to the outside through the IO-Link circuit unit 24 (Step S21).

Therefore, in the relative display mode, according to displaying in Step S21, the thermal type flow rate sensor 100 can present an amount of increase or decrease of the flow rate (flow velocity) from when the one touch tuning button 31 is pressed as a relative change amount (unit: %) with respect to the flow rate (flow velocity) at the time point when it is pressed.

Here, the processes of FIG. 8 and FIG. 9 are stored in the storage unit 23 in advance as programs. The MCU of the arithmetic unit 17 can read one of the programs in a specified mode according to an input from the operation unit 30 from the storage unit and execute the program.

COMPARATIVE EXAMPLE

Figure 10:
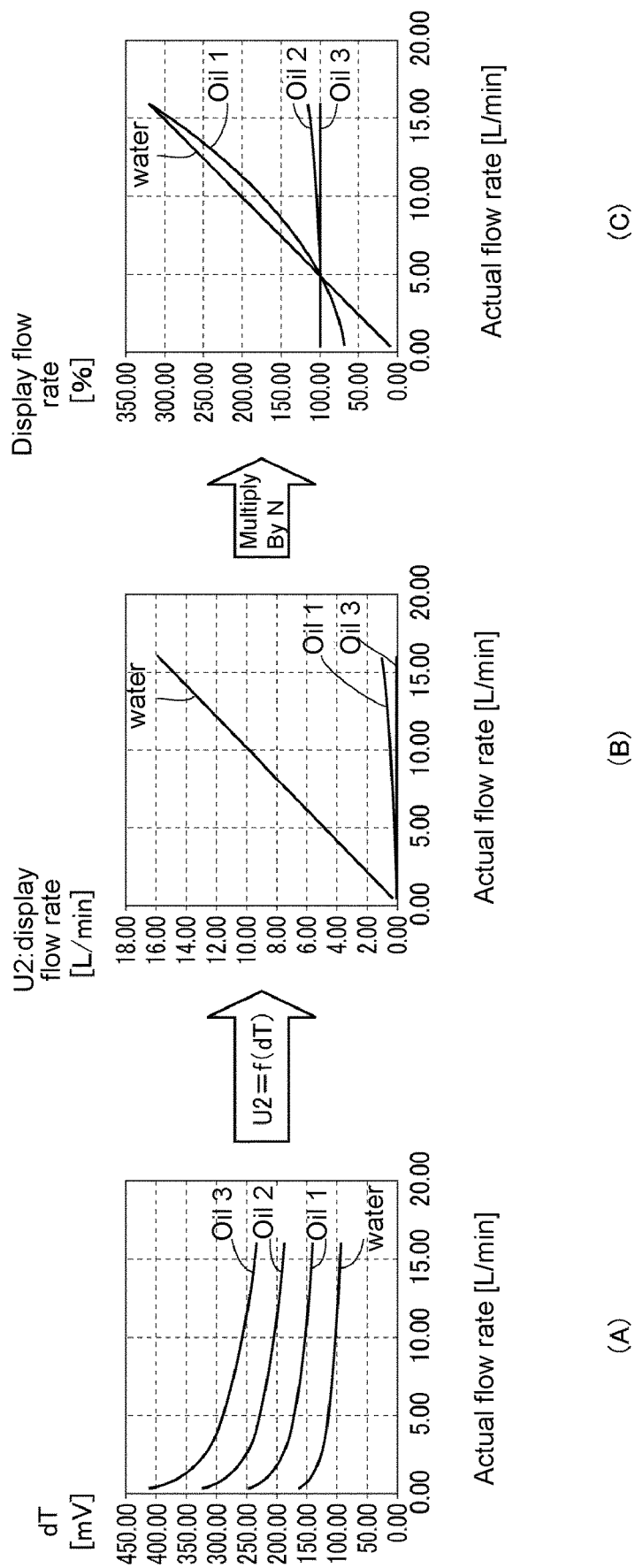
FIG. 10 shows diagrams for explaining a comparative example according to an embodiment.

Advantages when the above relative flow rate U1 is derived will be described with reference to comparative objects. FIG. 10 shows diagrams for explaining a comparative example according to an embodiment.

As described above, it is generally known that the correlation function between the temperature difference dT and the flow velocity U' is represented by $dT = a - b \times \sqrt{U} + c \times U$.

Regarding the above correlation function, the coefficient c can be considered to be substantially zero except for an area with a very low flow rate. In this case, $dT = a - b \times \sqrt{U}$, and the correlation function f for conversion can be obtained by $U = f(dT) = (a - dT)^2/b^2$ when a and b of the representative fluid 21 (for example, water) are measured in advance.

When the relationship between a temperature difference $dT_{OIL}$ and U for a certain type of oil is set as $dT_{OIL} = m \times a - n \times b \times \sqrt{U}$, a display flow rate U2 at this time is $U2 = f(dT_{OIL}) = [a - (m \times a - n \times b \times \sqrt{U})]^2/b^2$. That is, the display flow rate U2 can be calculated by the following equation. Here, the coefficients m and n denote values depending on characteristics of the fluid 21.

$$U2 = n^2 \cdot U + [2n \cdot (m-1) \cdot a/b] \cdot \sqrt{U} + [(m-1) \cdot a/b]^2$$

The (A) of FIG. 10 shows relationships between the temperature difference dT and the actual flow rate of various fluids 21. In the above equation, when the coefficient m is about 1 (the fluid 21 is water), the relationship between the display flow rate U2 derived using the temperature difference dT of water in (A) of FIG. 10 and the actual flow rate is a proportional relationship. However, in the case of m>1 (the fluid 21 is oil), according to the above equation, since a nonlinear component and an intercept component increase, as shown in (B) of FIG. 10 and (C) of FIG. 10, the display flow rate U2 and the actual flow rate do not have a proportional relationship.

On the other hand, in the relative display mode when the one touch tuning button 31 is pressed, the value of the parameter N in $dT_{OIL} = m \times a - n \times b \times \sqrt{U} \times (a - b \times \sqrt{U})$ is derived and stored in the storage unit 23. In the relative display mode, after the one touch tuning button 31 is pressed, the display flow rate U1 is derived according to the correlation function f using dT/N which is a value obtained by multiplying the detected temperature difference dT by 1/N normally. That is, since it is represented by $U1 = f(dT_{OIL}/N) = [a - (m \times a - n \times b \times \sqrt{U}/N)]^2/b^2$, the display flow rate U1 can be derived by the following equation.

$$U1 = (n/N)^2 \cdot U + [n/N] \cdot (1 - m/N) \cdot 2a/b] \cdot \sqrt{U} + [(1 - m/N) \cdot a/b]^2$$

Here, when coefficients m and n related to characteristics of an oil are substantially the same, the parameter N and the coefficients m and n are substantially the same values, that is, a nonlinear component and an intercept component are minimized. As a result, the relationship between the display flow rate U1 and the actual flow rate U can be approximated to the proportional relationship (refer to (C) of FIG. 6).

On the other hand, when m and n are different, from $dT_{OIL} = m \cdot a - n \cdot b \times \sqrt{U} = N \cdot (a - b \times \sqrt{U})$, $N = m + (m-n) \cdot b \sqrt{U}/(a - b\sqrt{U})$ is derived, and a deviation (difference) occurs between values of N and m according to a difference between values of the coefficient m and the coefficient n.

(Component of Thermal Resistance)

Figure 11:
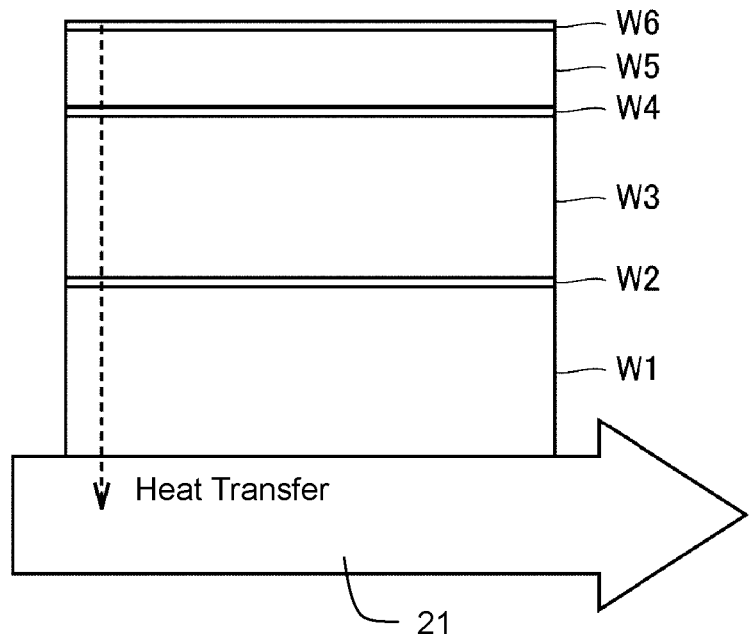
FIG. 11 is a diagram schematically showing a bonding part between a steel pipe 3 and a resistor according to an embodiment.
Figure 12:
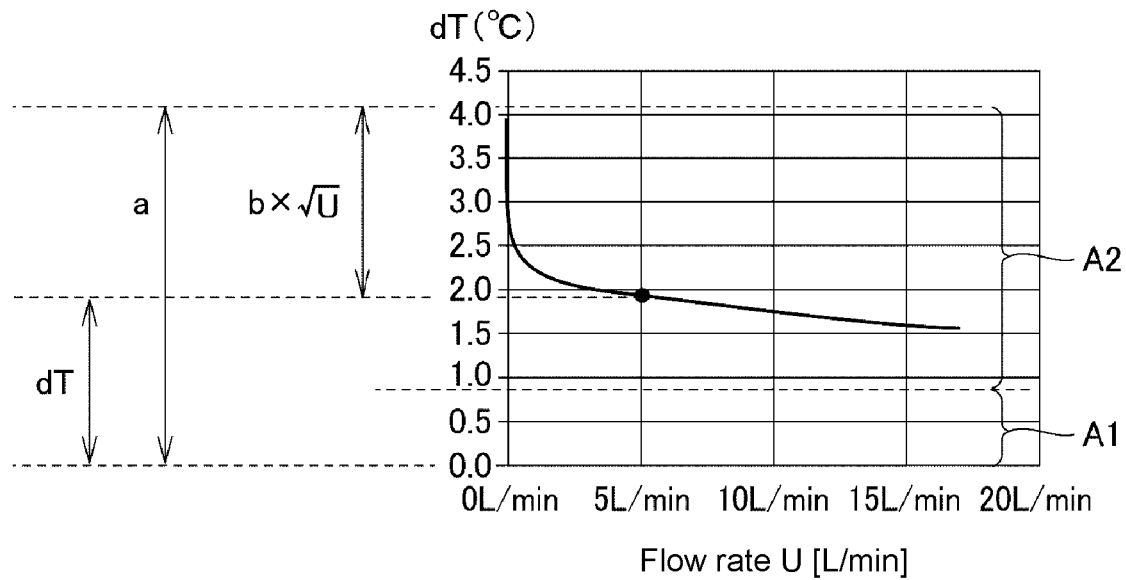
FIG. 12 is a diagram schematically showing components of a temperature difference dT according to an embodiment.

The cause of the above deviation (difference) includes a thermal resistance in the bonding part between the steel pipe 3 and the resistor (the first resistor R1 or the second resistor R2). FIG. 11 is a diagram schematically showing the bonding part between the steel pipe 3 and the resistor according to an embodiment. FIG. 12 is a diagram schematically showing components of the temperature difference dT according to an embodiment.

Referring to FIG. 11, the steel pipe 3 of the probe 4 is an example of an "accommodation unit" in which the first resistor R1 and the second resistor R2 are accommodated and which can be disposed along the flow path. The steel pipe 3 includes the outer circumferential surface 33 made of a metal material that is exposed to the fluid 21 when disposed along the flow path (pipe) and the inner circumferential surface 32 which is a rear surface with respect to the outer circumferential surface 33. The first resistor R1 and the second resistor R2 are formed on (bonded to) the inner circumferential surface 32 through the bonding part for bonding using a metal material.

The first resistor R1 and the second resistor R2 are fixed to the inner circumferential surface 32 through a tank structure. The tank structure includes a stainless layer W1 (16 W/m·K) of the steel pipe 3, a copper plating layer W2, a solder layer W3 (49 W/m·K) at the bonding part, a rear side metallized layer W4, an alumina layer W5 (36 W/m·K) as a substrate, and a resistor (for example, platinum) layer W6 which are sequentially laminated in a direction moving away from the fluid 21. In this manner, in order to metal-bond the layer W6 of the resistor and the steel pipe 3, the rear surface of the layer W5 which is an alumina substrate is metallized. In addition, the metal plating layer W2 is provided on the inner circumferential surface 32 of the steel pipe 3.

As shown in FIG. 11, the relationship between the temperature difference dT and the flow velocity U' is determined by a thermal resistance from the fluid 21 to the layer W6 of the resistor. The thermal resistance from the fluid 21 to the resistor is a total of a thermal resistance of the layer W5 which is an alumina substrate supporting the layer W6, a thermal resistance of the layer W3 that bonds the layer W6 and the layer W1, a thermal resistance of the steel pipe 3, and a thermal resistance between the steel pipe 3 and the fluid 21. When the flow velocity increases, a coefficient of heat transfer between the fluid 21 and the steel pipe 3 increases and a thermal resistance between the steel pipe and the fluid 21 decreases.

The coefficient of heat transfer between the fluid 21 and the steel pipe 3 changes according to the flow rate U. The relationship between the flow rate U and the heat transfer coefficient varies according to the type of the fluid 21. On the other hand, thermal resistances of the steel pipe, the solder, and the alumina substrate are fixed components independent of the flow rate U of the fluid 21, and do not depend on the type of the fluid 21.

On the other hand, the fixed components are influenced by variations between factors such as bonding between the steel pipe 3 and elements. Variation between fixed component factors can be cancelled out by correction in the production process. However, there is a possibility of a nonlinear component increasing in the temperature difference dT acquired when the one touch tuning button 31 is operated. Therefore, it is desirable that the fixed components be small.

In the embodiment, the above fixed component (DC component) is reduced by the rear side metallized layer W4 without using a resin material or the like for the bonding part while increasing thermal conductivity using the solder layer W3.

Referring to FIG. 12, the above temperature difference dT is a sum of a component A2 that depends on the type of the fluid 21 and changes according to the flow rate and a fixed component A1 independent of the fluid 21. For example, when there is a thermal resistance at the bonding part between the steel pipe 3 and the resistor (platinum), a temperature difference component independent of the flow rate is generated. This is a component that does not depend on the type of the flow rate and does not contribute to the coefficient m. Therefore, when the thermal resistance between the steel pipe 3 and the resistor (platinum) increases, the deviation between the coefficients m and n increases. In order to ensure the proportional relationship in (C) of FIG. 6, as described in FIG. 11, it is desirable that the thermal resistance between the steel pipe 3 and the resistor (platinum) be minimized.

In the embodiment, when the bonding part in FIG. 11 is included, it is possible to reduce the fixed component A1 and it is possible to maintain linearity ((C) of FIG. 6) when the flow rate is calculated by the correlation function f.

DISPLAY EXAMPLE

FIG. 13(A) to FIG. 13(C) show diagrams showing a display example according to an embodiment. FIG. 13(A) shows a state in which an absolute value or relative value of flow rate before button is pressed, where FIG. 13(A) shows an actually measured flow rate value which is a display example in the absolute display mode. FIG. 13(B) shows a state in which an actual flow rate value when the one touch tuning button 31 is pressed is displayed as a display value (100%). In FIG. 13(C), in the relative display mode after the one touch tuning button 31 is pressed, a percentage (unit: %) of an increase and decrease (change) based on the initial flow rate (100%) in FIG. 13(B) is displayed as a relative flow rate. In FIG. 13(C), according to the display value (80%), reduction by 20% from a reference flow rate is presented.

MODIFIED EXAMPLE OF EMBODIMENT

In another aspect of the above-described embodiment, in consideration of a trade-off relation between an input range of the MCU of the arithmetic unit 17 and accuracy, a method of multiplying the temperature difference dT by N may be realized by dynamically changing a pulse width of a current supplied to the first resistor R1.

FIG. 14 shows diagrams for explaining a modified example of the embodiment. In FIG. 14, a broken line waveform shows a waveform of the temperature difference dT when the fluid 21 is, for example, water, and a solid line shows a waveform of the temperature difference dT when the fluid 21 is, for example, an oil. In (A) of FIG. 14, the arithmetic unit 17 detects the temperature difference dT of water, and the heating unit 25 configured to dynamically adjust a pulse width is controlled so that the detected temperature difference dT is changed in a direction indicated by an arrow AD, and a target value dT0 is finally reached. In such dynamic adjustment of the pulse width, a loop process including detection of the temperature difference dT by the arithmetic unit 17→control of the heating unit 25→change in the pulse width according to a heating signal is repeatedly performed, and, for example, when the pulse width becomes w, the temperature difference dT becomes the target value dT0.

In addition, according to the same dynamic adjustment, in the case of the oil in (B) of FIG. 14, the above loop process is repeatedly performed, and, for example, when the pulse width becomes w1, the temperature difference dT becomes the target value dT0.

The arithmetic unit 17 converts the determined pulse width w or w1 into the coefficient N, derives dT/N for each fluid 21 (water or oil), and stores the result in the storage unit 23.

Figure 15A:
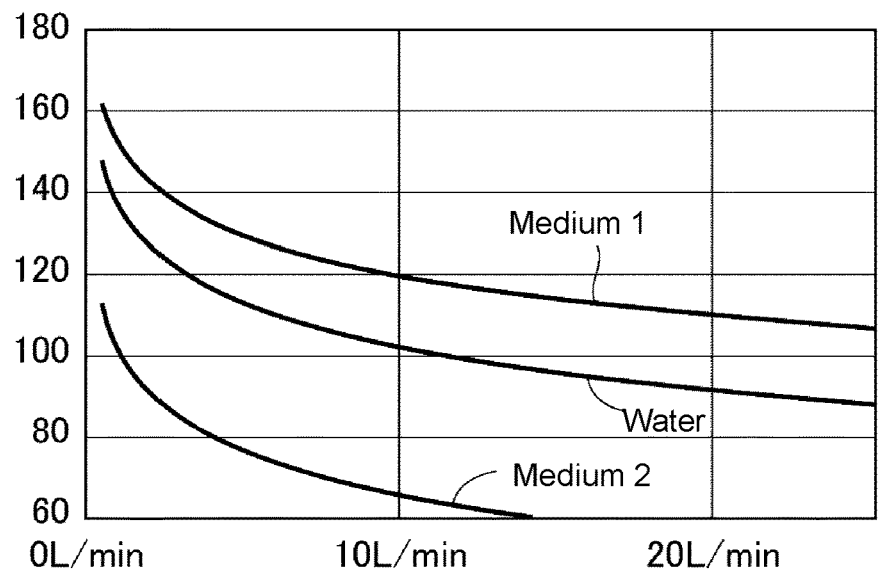
FIG. 15 (A) and FIG. 15(B) shows diagrams for explaining an advantage when a pulse width is changed in the modified example of the embodiment.
Figure 15B:
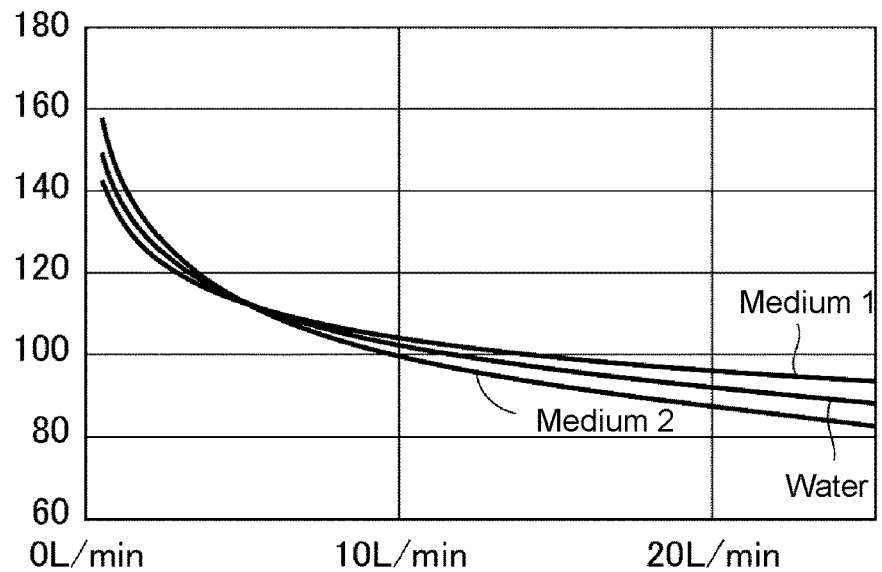

FIG. 15(A) and FIG. 15(B) show diagrams for explaining an advantage when a pulse width is changed in the modified example of the embodiment. FIG. 15(A) show diagrams of flow rate and voltage difference characteristics for each fluid. FIG. 15(B) show diagrams of flow rate and voltage difference characteristics for each fluid after one touch tuning is operated. Characteristics curves of the voltage difference according to the output of the AD conversion unit 16 shown in FIG. 15(A) and the flow rate are greatly different according to the type of the fluid 21. When the value indicated by the characteristics curve is input to the MCU of the arithmetic unit 17 and multiplied by N, a dynamic range of an amplification circuit may be insufficient and measurement accuracy may decrease. On the other hand, as described above, after the pulse width is dynamically adjusted, when the MCU derives the voltage difference (the temperature difference dT) according to the output of the AD conversion unit 16, as shown in FIG. 15(B), the values of the characteristics curve can be included in the range of the amplification circuit for various types of fluid.

In the modified example, after the one touch tuning button 31 is operated, the pulse width is constantly changed so that the temperature difference dT remains at the constant target value dT0. Specifically, a reference pulse width is determined in advance, and the parameter determination unit 26 derives a ratio of the pulse width with respect to the reference pulse width at a time point when the one touch tuning button 31 is operated as a parameter. Thereafter, the flow rate acquisition unit 27 calculates the flow rate according to a predetermined pulse width and flow rate conversion equation using a value obtained by dividing the pulse width by the derived ratio.

In this method, compared to a case in which a pulse width is fixed, it is possible to reduce a dynamic range of the temperature difference detection circuit. In addition, since the temperature difference dT is constant, there is no influence of a gain variation due to a temperature difference.

Here, FIG. 15(B) shows the temperature difference dT according to the output from the AD conversion unit 16 when the one touch tuning button 31 is pressed while the flow rate is 5 liters/min for mediums. For the mediums, it is possible to fit the characteristics curve within a predetermined range of the amplification circuit and it is possible to maintain measurement accuracy.

In such a modified example, when a pulse current is supplied to the first resistor R1, the parameter determination unit 26 of the arithmetic unit 17 determines a parameter (ratio of the pulse width) for converting the temperature difference dT detected when operation details according to pressing of the one touch tuning button 31 are received into the target value dT0. The flow rate acquisition unit 27 calculates the flow rate based on a predetermined function of the pulse width and flow rate conversion equation using the ratio (parameter) of the pulse width according to the temperature difference dT.

Advantage of Embodiment

In the embodiment, in the relative display mode, a relative value indicating a level of the flow rate of all types of fluid 21 is displayed. Therefore, the user can recognize relative flow rate information for various types of fluid 21. Here, in the embodiment, a temperature measurement unit including the first resistor R1 and the second resistor R2 may include a thermocouple.

What is claimed is:

1. A thermal type flow meter comprising:
 a probe adapted to be disposed along a flow path through which a fluid flows, the probe comprising:
  a first resistor which generates heat when a current is applied and outputs a first output signal indicating a heat generation temperature; and
  a second resistor which is disposed at a position different from that of the first resistor and outputs a second output signal indicating a temperature of the fluid,
 the thermal type flow meter further comprising:
 a current application circuit configured to apply a current to the first resistor so that the first output signal indicates a predetermined temperature;
 an output circuit configured to output a signal regarding a flow rate of the fluid based on a difference between the first output signal output from the first resistor and the second output signal output from the second resistor; and
 a processor configured to:
 a parameter determination unit configured to
  periodically turn current application to the first resistor on and off,
  determine a parameter for converting the difference into a target value, wherein the difference is detected when a predetermined input is received in the case that the current is applied, and
  acquire the flow rate using the parameter, the difference detected after the parameter is determined, and a predetermined function, wherein the parameter comprises a value indicating a current application on or current application off time in each period.

2. The thermal type flow meter according to claim 1, wherein the target value comprises a value according to a reference relationship that defines a reference for the relationship between the difference and the flow rate.

3. The thermal type flow meter according to claim 2, wherein the processor is further configured to calculate the flow rate according to the predetermined function using the difference and the parameter.

4. The thermal type flow meter according to claim 2, wherein the thermal type flow meter comprises a table tabulating recorded flow rates for sets of the difference and the parameter, wherein the recorded flow rate for a set is calculated according to the predetermined function using the difference and the parameter of the set, and the processor is further configured to read the corresponding flow rate from the table based on a set comprising the determined parameter and the difference detected after the parameter is determined.

5. The thermal type flow meter according to claim 2, wherein the processor is further configured to calculate the flow rate according to a correlation function between the difference and the flow rate based on the difference between the first output signal output from the first resistor and the second output signal output from the second resistor.

6. The thermal type flow meter according to claim 2, wherein the probe further comprises
 a pipe in which the first resistor and the second resistor are accommodated and which is able to be disposed along the flow path,
 wherein the pipe comprises a metal material surface that is exposed to a fluid when disposed along the flow path and a metal material bonding part that bonds the first resistor and the second resistor on a rear surface of the surface.

7. The thermal type flow meter according to claim 1, wherein the processor is further configured to calculate the flow rate according to the predetermined function using the difference and the parameter.

8. The thermal type flow meter according to claim 1, wherein the thermal type flow meter comprises a table tabulating recorded flow rates for sets of the difference and the parameter, wherein the recorded flow rate for a set is calculated according to the predetermined function using the difference and the parameter of the set, and the processor is further configured to read the corresponding flow rate from the table based on a set comprising the determined parameter and the difference detected after the parameter is determined.

9. The thermal type flow meter according to claim 1, wherein the processor is further configured to calculate the flow rate according to a correlation function between the difference and the flow rate based on the difference between the first output signal output from the first resistor and the second output signal output from the second resistor.

10. The thermal type flow meter according to claim 1, wherein the probe further comprises
 a pipe in which the first resistor and the second resistor are accommodated and which is able to be disposed along the flow path, wherein the pipe comprises a metal material surface that is exposed to a fluid when disposed along the flow path and a metal material bonding part that bonds the first resistor and the second resistor on a rear surface of the surface.

11. A flow rate processing device in which a probe adapted to be disposed along a flow path through which a fluid flows, the probe comprising a first resistor which generates heat when a current is applied and outputs a first output signal indicating a heat generation temperature; and a second resistor which is disposed at a position different from that of the first resistor and outputs a second output signal indicating a temperature of the fluid is able to be connected, the flow rate processing device comprising:
- a current application circuit configured to apply a current to the first resistor so that the first output signal indicates a predetermined temperature;
- an output circuit configured to output a signal regarding a flow rate of the fluid based on a difference between the first output signal output from the first resistor and the second output signal output from the second resistor; and
- a processor configured to
  - periodically turn current application to the first resistor on and off,
  - determine a parameter for converting the difference into a target value, wherein the difference is detected when a predetermined input is received in the case that the current is applied, and
  - acquire the flow rate using the parameter, the difference detected after the parameter is determined, and a predetermined function, wherein the parameter comprises a value indicating a current application on or current application off time in each period.

12. A thermal type flow rate measurement method using a thermal type flow meter comprising a probe adapted to be disposed along a flow path through which a fluid flows, the probe comprising a first resistor which generates heat when a current is applied and outputs a first output signal indicating a heat generation temperature; and a second resistor which is disposed at a position different from that of the first resistor and outputs a second output signal indicating a temperature of the fluid, the thermal type flow meter further comprising a current application circuit configured to apply a current to the first resistor so that the first output signal indicates a predetermined temperature; and an output circuit configured to output a signal regarding a flow rate of the fluid based on a difference between the first output signal output from the first resistor and the second output signal output from the second resistor, the thermal type flow rate measurement method comprising:
- periodically turning current application to the first resistor on and off,
- determining a parameter for converting the difference into a target value, wherein the difference is detected when a predetermined input is received in the case that the current is applied; and
- acquiring the flow rate using the parameter, the difference detected after the parameter is determined, and a predetermined function, wherein the parameter comprises a value indicating a current application on or current application off time in each period.

* * * * *